United States Patent [19]
Brown et al.

[11] Patent Number: 5,941,068
[45] Date of Patent: *Aug. 24, 1999

[54] AUTOMOTIVE HYDROCARBON ADSORBER SYSTEM

[75] Inventors: Jacqueline L. Brown, Lindley; Thomas D. Ketcham, Big Flats, both of N.Y.

[73] Assignee: Corning Incorporated, Corning, N.Y.

[ * ] Notice: This patent is subject to a terminal disclaimer.

[21] Appl. No.: 08/910,905

[22] Filed: Aug. 13, 1997

Related U.S. Application Data

[60] Provisional application No. 60/025,014, Aug. 26, 1996.

[51] Int. Cl.$^6$ .................................................. F01N 3/00
[52] U.S. Cl. ...................... 60/297; 60/301; 60/288; 60/311; 422/169; 422/177
[58] Field of Search ................ 60/297, 301, 288, 60/311; 422/169, 171, 177

[56] References Cited

U.S. PATENT DOCUMENTS

| | | |
|---|---|---|
| 3,144,309 | 8/1964 | Sparrow . |
| 3,783,619 | 1/1974 | Alquist . |
| 3,813,226 | 5/1974 | Heitland et al. . |
| 3,844,119 | 10/1974 | Herrbrich . |
| 3,988,890 | 11/1976 | Abthoff et al. . |
| 3,995,423 | 12/1976 | Aoki et al. . |
| 4,023,360 | 5/1977 | Wössner et al. . |
| 5,067,319 | 11/1991 | Moser . |
| 5,277,026 | 1/1994 | Boll et al. . |
| 5,345,762 | 9/1994 | Lütze . |
| 5,347,309 | 9/1994 | Moeckel et al. . |
| 5,398,503 | 3/1995 | Danno et al. . |
| 5,449,499 | 9/1995 | Bauer et al. . |
| 5,538,697 | 7/1996 | Abe et al. . |
| 5,603,216 | 2/1997 | Guile et al. . |
| 5,619,853 | 4/1997 | Brown ........................................ 60/288 |
| 5,657,626 | 8/1997 | Brown et al. .............................. 60/274 |
| 5,693,294 | 12/1997 | Anderson et al. ....................... 422/171 |
| 5,787,707 | 8/1998 | Hertl et al. ................................. 60/297 |

FOREIGN PATENT DOCUMENTS

| | | |
|---|---|---|
| 1 275 772 | of 0000 | United Kingdom . |
| 2 240 486 | of 0000 | United Kingdom . |
| 95/18292 | of 0000 | WIPO . |

*Primary Examiner*—F. Daniel Lopez
*Assistant Examiner*—Bihn Tran
*Attorney, Agent, or Firm*—Timothy M. Schaeberle

[57] ABSTRACT

The invention is directed at an engine exhaust system comprising: (1) a main catalyst located downstream from engine; (2) a honeycomb adsorber structure having an inlet and outlet end disposed in a housing and located downstream from the main catalyst, the honeycomb structure having a first substantially unobstructed flow region (a by-pass port) having an inlet face, and a second more obstructed flow region adjacent the first region (plurality of channels) having a second inlet face, the inlet face of the first region located upstream that of the inlet face of the second region; (3) a fluidics apparatus disposed in the housing and comprising a diverter body located upstream and proximate to the inlet face of the first region, a diversion fluid source conduit for directing the diversion fluid, proximate the diverter body; and, (4) a burn-off catalyst located downstream of the honeycomb adsorber.

7 Claims, 9 Drawing Sheets

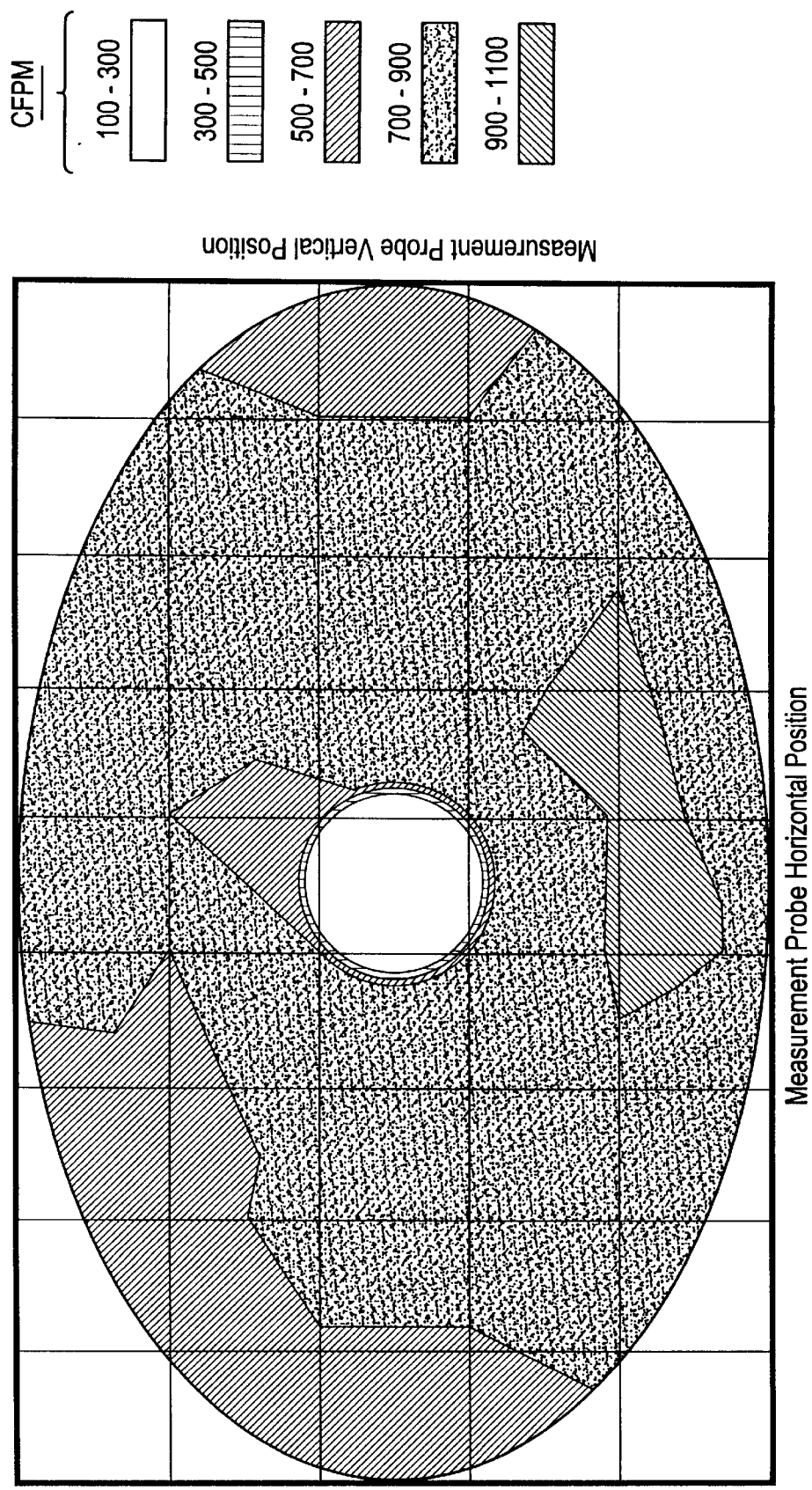

AUTOMOTIVE HYDROCARBON ADSORBER SYSTEM

This application claims the benefit of U.S. Provisional Application Ser. No. 60/025,014, filed Aug. 26, 1996, entitled AUTOMOTIVE HYDROCARBON ADSORBER SYSTEM, by Jacqueline L. Brown and Thomas D. Ketcham.

FIELD OF THE INVENTION

This invention relates to an improved engine exhaust system, and more particularly to an improved cold-start adsorber exhaust system comprised of an adsorber honeycomb structure having a first low flow-resistance region and a second more obstructed flow region adjacent to the first region, the inlet of the first region being located at a position upstream of the inlet of the second.

BACKGROUND OF THE INVENTION

At the present time, automotive exhaust systems equipped with catalytic conversion systems generally comprise an exhaust line connecting with a converter housing, the housing enclosing a ceramic or metal honeycomb substrate supporting an oxidation or, more commonly, a three-way emissions control catalyst. The three-way catalyst operates to oxidize carbon monoxide and unburned hydrocarbons present in the exhaust stream and, with proper control of exhaust stream stoichiometry, to at least partially reduce higher oxides of nitrogen (NOx) contained therein.

Tightened emissions standards for automotive gasoline engines have placed higher demands on the performance of these catalytic conversion systems. Particularly critical for overall system performance is performance during the so-called "cold start" phase of engine operation. This is the period of engine operation covering approximately the first 60 seconds after cold engine start and prior to startup or "light off" of the catalytic converter, during which the highest concentrations of unburned hydrocarbons are released into the atmosphere.

One type of exhaust system designed specifically to address the cold-start problem provides a hydrocarbon adsorber in the exhaust line. The adsorber operates to trap unburned hydrocarbons emitted during engine startup, and then to release those hydrocarbons to a catalytic converter after converter light-off has been achieved. A preferred configuration for an adsorber in such systems is a honeycomb structure, similar in construction to a catalyst support honeycomb but composed of, or supporting, a coating of a hydrocarbon adsorbent such as carbon, zeolite, or another molecular sieve material.

Examples of recently developed cold-start engine emissions control systems of this type are disclosed in published patent applications WO 95/18292, EP 0661098 and EP 0697505 (Hertl et al). Two further examples of such system are described in co-pending, commonly assigned U.S patent application Ser. No. 08/578,003 (Brown et al.) filed Dec. 22, 1995 and entitled "Exhaust System with a Negative Flow Fluidics Apparatus" and U.S. patent application Ser. No. 08/685,130 of J. Anderson et al. filed Jul. 24, 1996 and entitled "Exhaust Gas Fluidics Apparatus".

A common feature of these systems is a ported honeycomb adsorber, i.e., an adsorber comprising a by-pass port integral with its structure, located downstream of a main or light-off catalytic converter but positioned upstream of a second or so-called "burn-off" catalytic converter. This adsorber functions to trap the hydrocarbons released at engine startup and slowly desorb and release the hydrocarbons to the burn-off converter as the adsorber is heated by the warming exhaust gases. A particular advantage of the ported adsorber design is the faster light-off of the burn-off converter due to exposure of that converter to the hot exhaust gases passing directly through the adsorber port. In the design of Hertl et al., Brown et. al. and Anderson et al., control the flow of the exhaust gases through or past the adsorber is secured by means of a fluidic diverter which delivers a control gas stream for diverting the exhaust gases toward or away from the adsorber port in the course of engine operation.

Although these cold-start adsorber exhaust systems provide improved emissions performance, (i.e., during the adsorption phase) the resulting flow characteristics for this system when the fluidics diverter is operational are not completely ideal and are somewhat unstable, as they are quite dependent on engine conditions and diverter/honeycomb positioning. Specifically, under adsorbing/diversion conditions, the flow pattern across the inlet face of the actual adsorber tends to somewhat non-uniform; i.e., a high flow volume in the adsorber cells proximate to the centrally located by-pass port and a reduced flow volume in those cells nearer the edge of the adsorber. Furthermore, the instability of the flow in these systems may result in exhaust flows wherein a portion of the exhaust gas continues to pass through centrally-located by-pass port, thus resulting in hydrocarbons which pass through un-adsorbed. This being the case, work has continued to discover exhaust systems exhibiting more stable, improved exhaust flow characteristics and performance.

SUMMARY OF THE INVENTION

Accordingly, it is one of the objectives of the instant invention to provide an cold-start engine exhaust system exhibiting a more stable and uniform exhaust flow; i.e. a uniform flow across the adsorber and a negative flow in the by-pass port which can be maintained under a variety of configurations and engine conditions. Specifically, the exhaust system comprises the following main components: (1) a main catalyst located downstream from an engine; (2) a honeycomb adsorber structure comprising a by-pass port integral with its structure (i.e., an adsorber with both high and low flow-resistance flow regions) and having an inlet and outlet end disposed in a housing and located downstream from the main catalyst; (3) a fluidics apparatus disposed in the housing and comprising a diverter body located upstream and proximate to the inlet of the low flow-resistance region and a diversion fluid source conduit for directing the diversion fluid toward the diverter body; and, (4) a burn-off catalyst located downstream of the adsorber. Specifically, the improvement in the exhaust system involves providing a honeycomb adsorber structure having a first substantially unobstructed flow (low flow-resistance) region having an inlet face and position, and a second more obstructed flow region adjacent the first region having a second inlet face and position, wherein the inlet face of the first region is located at a position upstream that of the inlet face of the second region. As a result of this improved adsorber design, there is an increase in exhaust gas flow uniformity and an enhanced exhaust gas flow stability.

BRIEF DESCRIPTION OF THE FIGURES

FIG. 7 is a graphical illustration, for comparison, of the flow profile exhibited the conventional adsorber cold-start exhaust system.

DETAILED DESCRIPTION OF THE INVENTION

The present invention provides an improvement in an engine exhaust system of the adsorber-based cold-start type described above. The conventional system typically comprises the following: (1) an exhaust conduit supplying exhaust gas to an adsorber or molecular sieve mounted in an enclosure downstream of an engine, the adsorber comprising a honeycomb with a plurality of honeycomb channels and an integral by-pass port through the honeycomb for the transmission of the exhaust gas therethrough; i.e., a high flow-resistance region and a low flow-resistance region; (2) catalytic converters mounted upstream and downstream of the adsorber; and, (3) a diverter having an outlet within the enclosure and upstream of the by-pass port for delivering a diversion fluid from a source external to the enclosure. The diverter provided in these systems acts mainly to direct the flow of exhaust gases away from the by-pass port and through the honeycomb channels for effective hydrocarbon adsorption during the early or cold-start phase of engine operation.

For controlling the flow path of the exhaust gas, the diverter comprises a diverter body configured to direct the secondary air stream, when present, in a direction effective to at least partially divert the exhaust gas stream away from the by-pass path and through the adsorber portion. The design of the diverter body need not differ from the designs previously employed in conventional systems.

Figure 1:
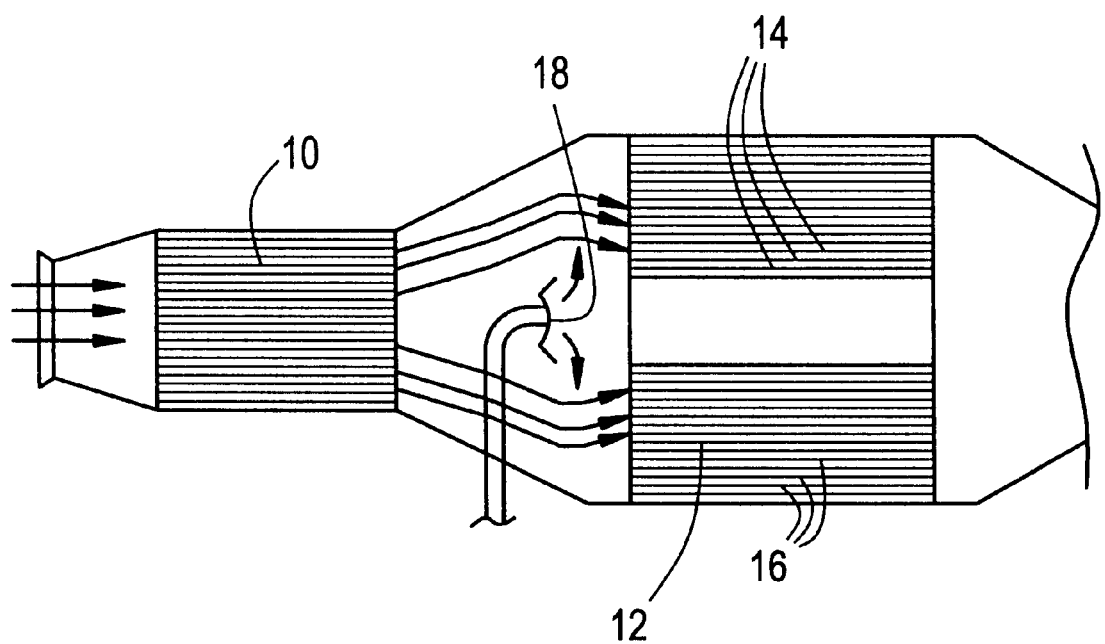
FIG. 1 is an elevational cross-sectional view illustrating the exhaust gas flow patterns in the conventional adsorber-containing cold-start exhaust systems.

Referring now to FIG. 1 illustrated therein is a typical flow pattern exhibited by the above conventional cold-start adsorber exhaust systems. Specifically, as the exhaust gas, as represented by the arrows, exits the main catalyst 10 and enters the adsorber honeycomb 12, a larger portion of the exhaust gas enters the channels 14 nearer the center hole or by-pass region than those channels 16 in the peripheral portion; even, in spite of, the diversion of the exhaust gases by the diverter 18.

Figure 2:
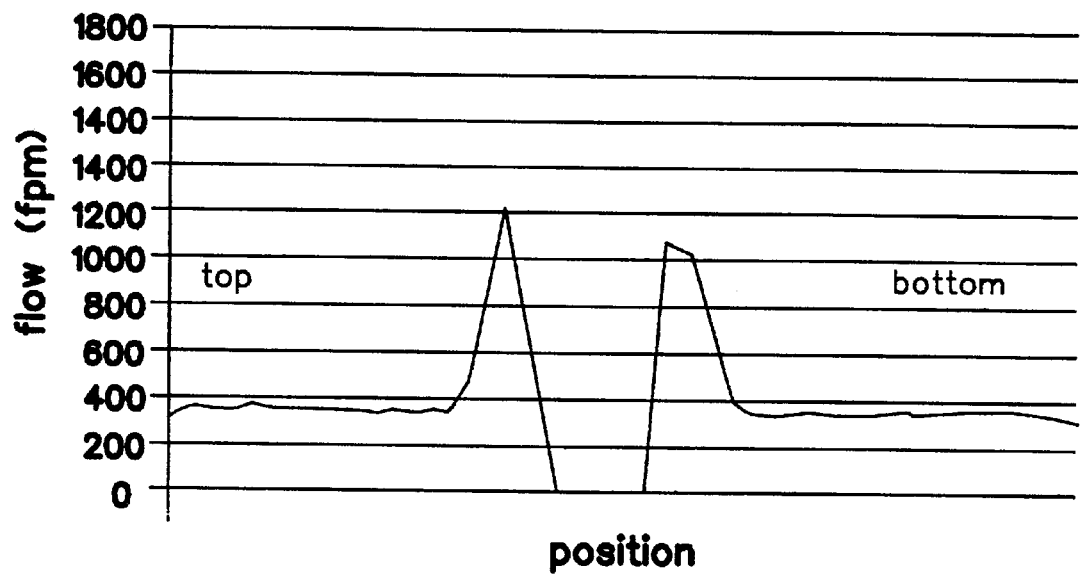
FIGS. 2 and 2a are graphs representative of the exhaust gas flow through a honeycomb adsorber structure in the conventional adsorber cold-start exhaust systems.
Figure 2A:
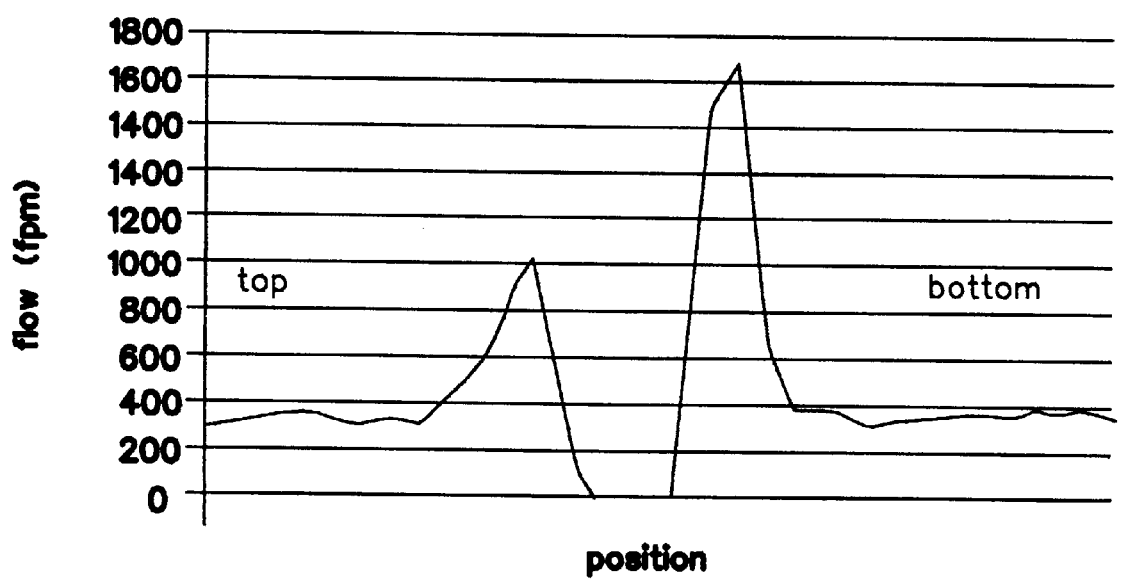

The uneven distribution of the exhaust gas flow across the face of the adsorber, one undesirable characteristic of conventional cold-start adsorber systems, is illustrated in FIGS. 2 and 2a. These graphs are plots of flow data generated by subjecting a conventional cold-start adsorber system, a system like that disclosed in the aforementioned Anderson reference having a zeolite adsorber (14.38 cm diameter and a 4.75 diameter by-pass port), to a 40 cubic feet per minute (cfpm) simulated exhaust gas flow exposed to 10 cfpm of diversion air. It is clear that whether the exhaust gas flow is measured from top-to-bottom, FIG. 2, or left-to-right, FIG. 2a, a majority of the flow occurs through the honeycomb channels proximate the central hole or by-pass region. Problems inherent in this uneven flow are two-fold: (1) because a majority of hydrocarbons in the exhaust gas are adsorbed on a small area of the adsorber, the zeolite typically used to trap the hydrocarbons, quickly reaches its maximum storage capacity, thereby allowing un-absorbed hydrocarbons to pass through; and, (2) once the adsorption period is complete and the diversion air is discontinued, the exhaust gas which now passes through the central hole or by-pass portion causes the honeycomb to heat radially outward, which in turn causes the hydrocarbons adsorbed nearer the central portion (a majority of the total adsorbed) to desorb before the downstream or burn-off catalyst has become fully activated.

The improvement provided in accordance with the invention is one wherein the molecular sieve or adsorber honeycomb comprises a first region having a low flow-resistance to exhaust gas and an inlet face (i.e., a by-pass/central port or a first plurality of honeycomb channels), and an adjacent second region, having a second, higher, flow resistance to exhaust gas and a second inlet face (i.e., plurality of honeycomb channels). Furthermore, the inlet face of the first flow region is located upstream of the inlet face of the second flow region.

The purpose of the inlet face design is to allow for a design of a system whereby the diverter body-to-bypass port distance can be maintained at approximately same distances as in previous systems, yet the actual adsorber honeycomb can be positioned closer to the exit end of the exhaust system. The resulting differences in inlet face positioning allows for a system where: (1) the stability of the flow pattern is increased by being less dependent on the exhaust gas system configuration, as well as, engine conditions, i.e., the negative flow region desired in the center region/by-pass port, under adsorption conditions, can be maintained under varying engine conditions; and, (2) the flow of exhaust gases which reach the adsorber are more uniformly distributed across the face of the adsorber; i.e., flow volume through the peripheral channels more closely matches the gas flow volume through the more central channels.

Figure 3:
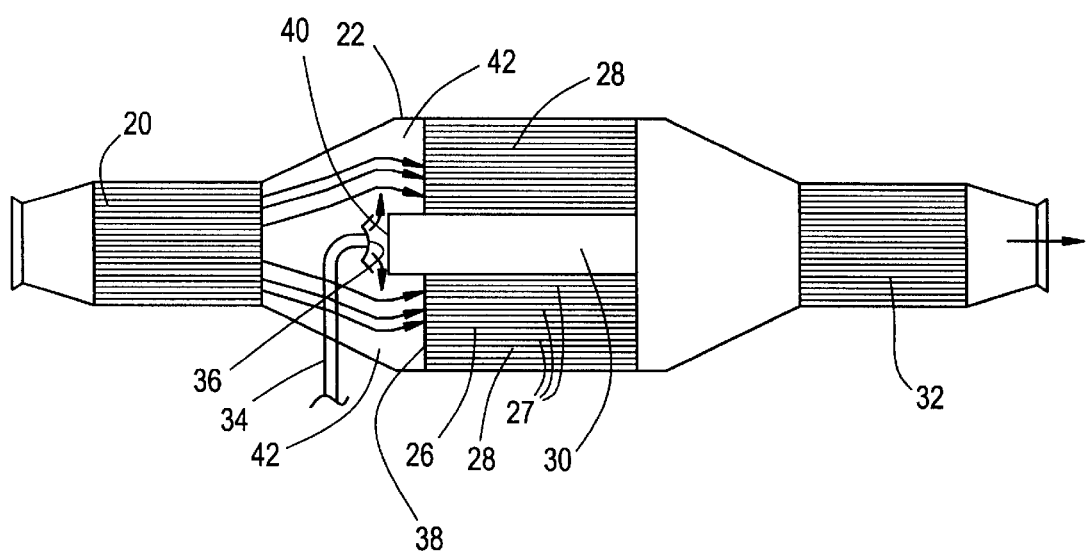
FIG. 3 is a elevational cross-sectional view illustrating the exhaust gas flow patterns in the inventive adsorber cold-start exhaust system.

An example of an engine exhaust system incorporating the improved adsorber system is set forth in FIG. 3 which comprises a schematic illustration in elevational cross-section of a typical system design, although not in true proportion or to scale. As shown in the drawing, exhaust gas flowing from an engine (not shown) in the direction as depicted passes through main catalyst 20 and by arrows enters enclosure 22. Disposed within enclosure 22 is an adsorber 26, that adsorber comprising a honeycomb having a plurality of cells or through-channels 27 through which the exhaust gases may pass.

Adsorber 26 also features a by-pass port 30 consisting of a central hole through the honeycomb, through which the exhaust gases can flow and thereby impinge directly on catalytic converter 32 located downstream of adsorber 26. To direct the flow of exhaust gases away from port 30 at cold-start, a diverter line 34 for supplying a diversion fluid such as secondary air from an external fluid source such as an air pump (not shown) is provided. The outlet 36 of the diverter line is positioned proximate to and upstream of by-pass port 30.

As further shown in the drawing, adsorber 26 is designed such that the inlet face 40 of the first flow region (by-pass port) 30 is positioned upstream of inlet face 38 of the second or peripheral flow region 28 thereby creating a zone or region 42 wherein the exhaust gases are able to substantially disperse prior to entering the inlet face of the second flow zone 28. In other words, a larger portion of the exhaust gas is able to reach the peripheral portions 28 of adsorber 26 (i.e. portions near the wall of enclosure 22) with respect to channels located centrally and proximate to by-pass port 30.

Figure 3A:
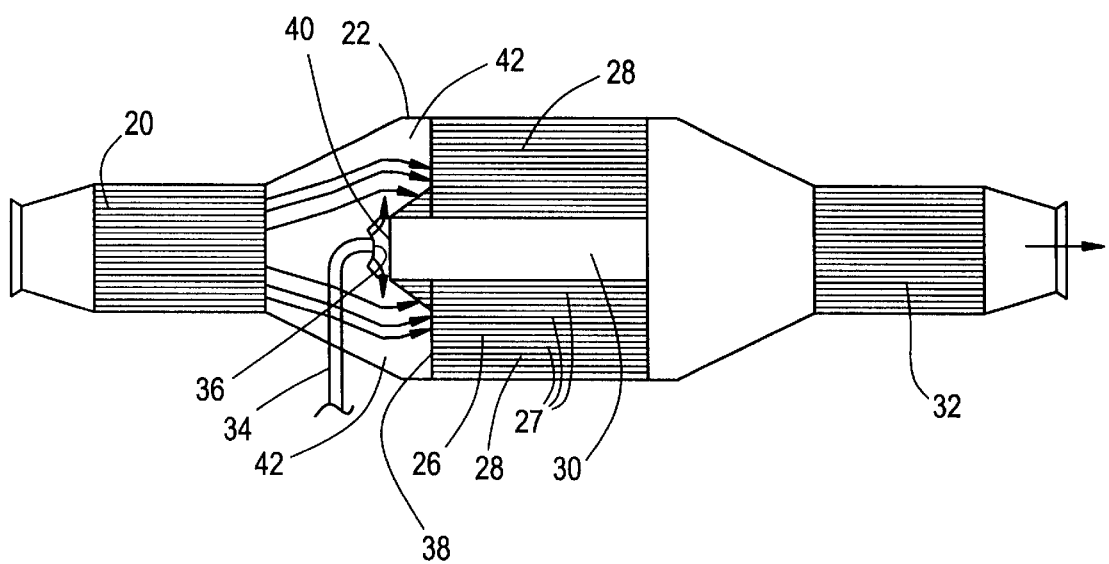
FIGS. 3A and 3B are additional embodiments of the incentives adsorber cold-start exhaust system of FIG. 3.
Figure 3B:
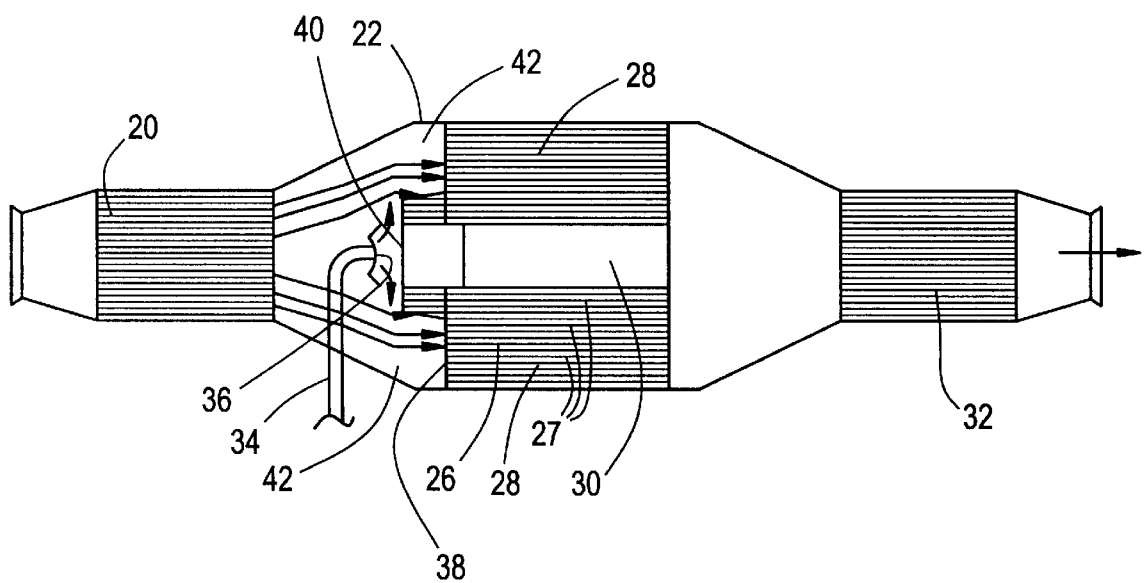

There are numerous configurations which achieve this "first flow region 30 inlet face 40 upstream of the second flow region 28 inlet face 38" design, other than the FIG. 3 design which is simply a tube or an extension inserted into the first flow region 30 which extends upstream of the inlet face of the adsorber. FIGS. 3A and 3B illustrate two additional configurations or embodiments wherein the upstream extension or inlet face 40 is an extension of the actual adsorber 26 itself.

Optional components which may be provided in conjunction with the improved adsorber as shown in FIG. 3 of the drawing include sensor for determining the concentrations of hydrocarbons or other species present in the exhaust, and secondary air inlets such as air injector port for controlling the stoichiometry of the gases being treated.

In the operation of a system provided in accordance with the invention such as shown in the FIG. 3, exhaust gases from the engine which are supplied to the adsorber through the exhaust conduit are initially diverted away from the by-pass port and through the honeycomb channels of the adsorber, by introducing a stream of diversion fluid at engine startup. Thus the unburned fuel and combustion by-products present in the exhaust are trapped on the adsorber honeycomb during this period.

After the temperature of the exhaust gases has risen and the concentration of unburned hydrocarbons in the exhaust stream is reduced, diversion of the exhaust stream away from the by-pass port is terminated and the heated exhaust gases are permitted to pass directly through the by-pass port to the catalytic converter mounted downstream of the adsorber. This converter then reaches its light-off temperature, and thereafter operates to oxidize those hydrocarbons released by the adsorber as adsorbent temperatures rise in the course of further engine operation.

As a direct result of the increase in exhaust flow uniformity and stability during "diverter-on" or adsorption conditions, this exhaust system exhibits the following advantages over conventional adsorber systems: (1) the effectiveness of the adsorber is improved since the adsorption capacity of the honeycomb channels near the honeycomb periphery are more fully utilized; (2) regardless of the exhaust system configuration and engine conditions, the majority, if not all, of the exhaust gas is caused to flow through the adsorber during the cold-start, thereby assuring that a majority/all of the hydrocarbons are adsorbed and that none pass into the atmosphere unburnt; (3) shorter adsorbers may now be utilized, whereas previously the adsorber length was quite long to compensate for the reduced adsorption capacity as a result of flow being concentrated in the centrally located channels, and, (4) a reduction and/or an elimination of premature desorption; i.e., a more uniform and increased peripheral exhaust gas flow will lead to more desorption occurring in those channels closer to the periphery and less in those channels closer to the by-pass or central region, which typically heat up faster and thereby desorb faster.

A "molecular sieve" as used herein refers to crystalline substances or structures having pore sizes suitable for adsorbing molecules. The term is generally used to describe a class of materials that exhibit selective absorption properties. To be a molecular sieve, as disclosed herein the material must separate components of a mixture on the basis of molecular size and shape differences. Such materials include silicates, the metallosilicates, metalloaluminates, the $AIPO_4$s, silico- and metalloaluminophosphates, zeolites and others known in the art. Furthermore, the terms "adsorber" and "adsorption" as used herein are intended to encompass both adsorption and absorption as these terms are generally known to persons skilled in the art; it is contemplated that both processes of adsorption and absorption occur in the molecular sieve structure of the invention.

If the honeycomb substrate comprises a molecular sieve structure, it, preferably, comprises zeolites supported on the honeycomb structure, with the zeolites selected from the group consisting of ZSM-5, USY, Mordenite, Beta zeolites and combinations of these. On the other hand, the molecular sieve structure may comprise an extruded zeolite selected from the same zeolite group.

The present invention is hereinafter described in more detail by way of Examples. However, the present invention is not restricted to these examples. In other words, the following non-limiting examples are presented to more fully illustrate the invention.

EXAMPLES

Figure 4:
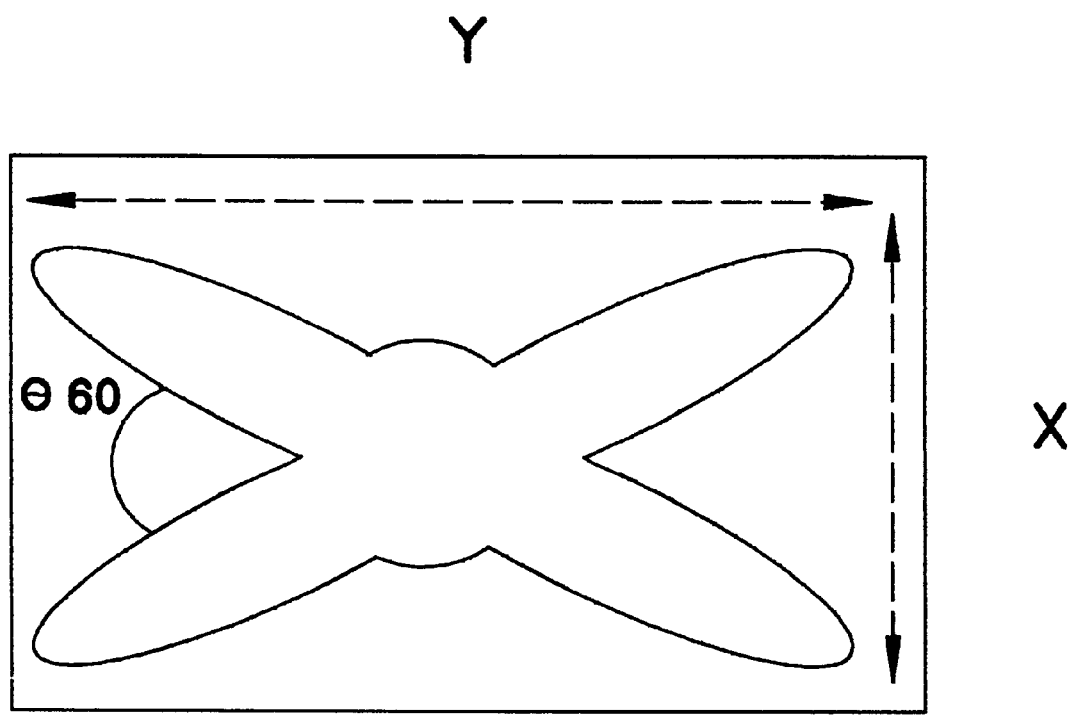
FIG. 4 is a schematic of one embodiment of a diverter body utilized in the inventive adsorber cold-start exhaust system.

Simulated exhaust systems resembling the system as depicted in FIGS. 3, were used to illustrate the improved "diverter-on"/adsorption flow achieved by the inventive system. Specifically, the basic exhaust system was comprised of the following: (1) a 16.2 cm long 400 cell per square inch elliptical honeycomb structure exhibiting a long and short axis of 14.8 cm and 8.4 cm, respectively, and a first flow region, a circular center hole, exhibiting a diameter of 4.8 cm; and, (2) a fluidics apparatus comprised of an X-shaped diverter body, as illustrated in FIG. 4, exhibiting an x-dimension of 5.3 cm., a y-dimension of 2.7 cm. and a θ of 60° positioned proximate to, and upstream of, the honeycomb substrate's center hole/first flow region and 1 mm downstream of a diversion fluid conduit outlet—an air supply tube.

Examples 1 and 2 included a tube, comprised of a 96% silica glass, commercially available as Vycor® glass, having a 4.6 cm outside diameter and a 4.1 cm inside diameter, inserted into the upstream end of the first flow region (circular center hole); the tube extending 4 cm upstream in Example 1 and 2 cm in Example 2. In other words, a system was simulated whereby the inlet face of the first flow region was located upstream of the inlet face of the second flow region. Example 3, for comparison, was comprised of only the adsorber honeycomb as described above, i.e., no upstream inlet face-extending tube.

A simulated exhaust flow, room temperature air exhibiting a volumetric flow rate of about 40 cubic feet per minute (cfpm), was passed into the housing and directed at the honeycomb substrate. Diversion air delivered at a volumetric-flow rate of 10 cfpm was utilized. The linear flow rate, in feet per minute (fpm) of the air leaving the honeycomb substrates was measured at several horizontal and vertical positions on the downstream face of the honeycomb structure utilizing a hand held Omegaflo model 610 Anemometer. These measurements were used to generate a "diverter-on" flow profile for each of the three Examples; the honeycomb substrate and by-pass port images superimposed on the profile.

Figure 5:
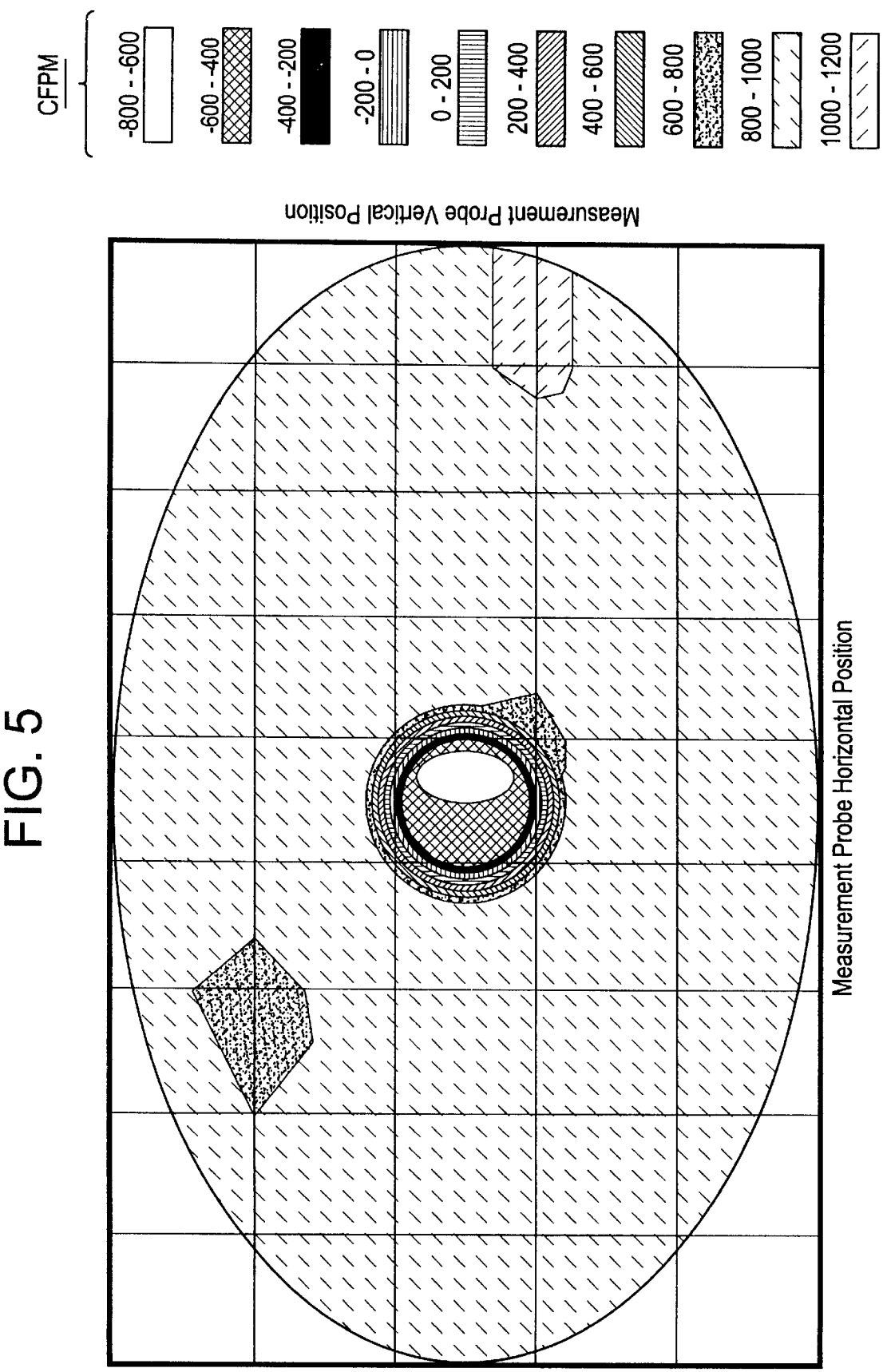
FIG. 5–6 are graphical illustrations of the improved exhaust flow profile exhibited by the inventive adsorber cold-start exhaust system.
Figure 6:
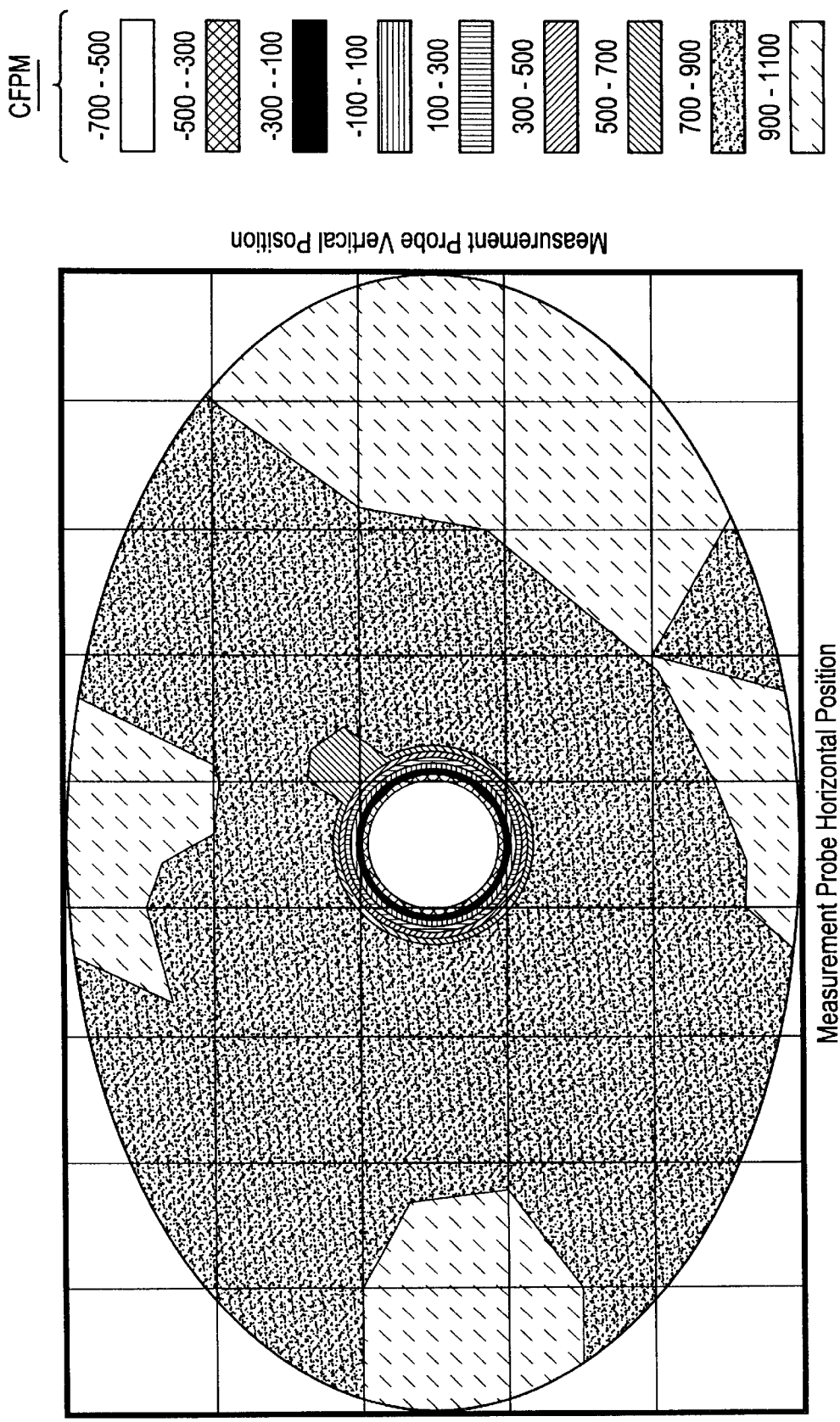

A comparison of FIGS. 5 and 6, the Example 1 and 2 exhaust systems 40 cfpm simulated exhaust (diverter-on)

flow data, with FIG. 7, the conventional cold-start adsorber system, reveals that the inventive cold-start adsorber system exhibits both an increase in peripheral flow, as well as the desired negative flow condition in the by-pass port. Referring specifically to the FIG. 5 flow profile, it reveals that a majority of the flow in the by-pass port ranges from −400 to −800 cfpm, while the flow across the adsorber channels is generally uniform and ranges from 800 to a 1000 cfpm. On the other hand, referring now to FIG. 7, the flow in the by-pass port is positive, with a majority ranging from 100 to 300 cfpm, while the flow in the adsorber channels reveals two lowered flow regions near the periphery exhibiting reduced flows of between 500 to 700 cfpm.

Although the invention has been described with respect to the above illustrated description and examples, it may be subjected to various modification and changes without departing from the scope of the invention. For example, although the examples have utilized only square cell channels, the invention can be extended to a variety of cell shapes for the honeycomb, (triangular, hexagonal, rectangular, flexible cells, etc.).

We claim:

1. An engine exhaust system comprising:
    a main catalyst located downstream from engine;
    a honeycomb adsorber or molecular sieve structure having an inlet and outlet end disposed in a housing and located downstream from the main catalyst,
        the honeycomb structure having a first substantially unobstructed flow region having an inlet face, and a second more obstructed flow region adjacent the first region having a second inlet face, the inlet face of the first region located upstream that of the inlet face of the second region;
    a fluidics apparatus disposed in the housing and comprising a diverter body located upstream and proximate to the inlet face of the first region, a diversion fluid source conduit for directing the diversion fluid, proximate the diverter body; and,
    a burn-off catalyst located downstream of the honeycomb adsorber.

2. The exhaust system of claim 1 wherein the conduit outlet is positioned sufficiently close to the diverter body whereby the diverter body imparts a flow component to the diversion fluid which is transverse to flow direction in the first region.

3. The exhaust system of claim 1, wherein the main catalytic converter comprises a three-way catalyst, a light-off catalyst, an oxidation catalyst or an electrically heated catalyst or combinations thereof.

4. The exhaust system of claim 1 wherein the molecular sieve structure comprises extruded zeolites selected from the group consisting of ZSM-5, USY, Mordenite, Beta zeolites and combinations of these.

5. The exhaust system of claim 4 wherein the molecular sieve structure comprises zeolites supported on a substrate.

6. The exhaust system of claim 5 wherein the substrate is in a form selected from the group consisting of pellets and cellular monoliths.

7. The exhaust system of claim 6 wherein the substrate is an extruded honeycomb structure.

* * * * *